United States Patent

Wheeler, Jr.

[15] 3,674,891
[45] July 4, 1972

[54] NON-CROSSLINKED OLEFINIC SILOXANE-ORGANIC POLYMER GRAFT COPOLYMERS

[72] Inventor: Marshall L. Wheeler, Jr., Olean, N.Y.
[73] Assignee: Union Carbide Corporation, New York, N.Y.
[22] Filed: July 23, 1970
[21] Appl. No.: 57,797

Related U.S. Application Data

[63] Continuation-in-part of Ser. No. 422,037, Dec. 29, 1964, Pat. No. 3,573,334, which is a continuation-in-part of Ser. No. 356,944, April 2, 1964, abandoned.

[52] U.S. Cl...........................260/827, 204/159.13, 252/8.6, 252/8.9, 252/49.6, 252/351, 260/18 S, 260/29.2 M, 260/29.6 NR, 260/33.2 SB, 260/33.6 SB, 260/33.8 SB, 260/448.2 E, 260/448.2 Q, 260/824
[51] Int. Cl......................................C08g 47/10, C08f 29/50
[58] Field of Search.....................260/827, 448.2 U, 448.2 Q

[56] References Cited

UNITED STATES PATENTS 3,573,334  3/1971  Wheeler..............................260/448.2

FOREIGN PATENTS OR APPLICATIONS 860,327  2/1961  Great Britain........................260/827

Primary Examiner—Samuel H. Blech
Attorney—Paul A. Rose, Aldo John Cozzi, Eugene C. Trautlein, George A. Skoler and Reynold J. Finnegan

[57] ABSTRACT

This invention provides non-crosslinked copolymers of olefinic siloxanes grafted to one of a particular class of organic polymers [i.e. polyurethanes, polyesters, epoxy resins, polyacetals, polysulfides, polycarbonates, phenoxy resins, mineral oils, polystyrene, polyacrylates, polyvinyl chloride and polymers comprising at least one of the following types of units:

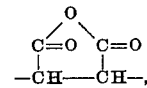

—$CH_2$—$CH(OCOCH_3)$—, —$CH_2$—$CCl$—, —$CH_2$—$CFH$—, —$CF_2$——, —$CH_2$—$CH(CN)$—, —$CH_2$—$CH(OR)$—, —$CH_2$—$CH$—$CCl_2$—, —$CH_2$—$CH$  $C(CH_3)$—$CH_2$— and —$CH_2CH$  $ClCH_2$— wherein R is alkyl].

4 Claims, No Drawings

NON-CROSSLINKED OLEFINIC SILOXANE-ORGANIC POLYMER GRAFT COPOLYMERS

CROSS-REFERENCES TO RELATED APPLICATION

This application is a continuation-in-part of application, Ser. No. 422,037, filed Dec. 29, 1964, now U.S. Pat. No. 3,573,334, which was a continuation-in-part of application, Ser. No. 356,944, filed Apr. 2, 1964 now abandoned.

This invention relates generally to non-crosslinked silicone-organic polymer graft copolymers that are useful as surfactants and to processes for preparing same. More particularly, it relates to non-crosslinked silicone-organic polymer copolymers to which the name "graft" copolymer is applied in that at least one silicone group is attached as a side chain to at least one organic polymer by means of a hydrolytically stable linkage along the "backbone" provided by the organic polymer chain.

Prior to this invention certain specific silicone-organic graft copolymers have been suggested. However, such graft copolymers are generally crosslinked and unsuited for use as surfactants.

In accordance with the present invention, it has been found that novel non-crosslinked silicone-organic polymers copolymers wherein the silicone portion is attached to the organic polymer portions via a hydrolytically stable silicon to carbon linkage are readily prepared by the free radical-catalyzed graft copolymerization of certain organic polymers with silicone compounds containing olefinic unsaturation. More particularly, the process comprises heating, in the presence of an organic peroxide catalyst, a solvent solution containing a certain type of a non-crosslinked organic polymer consisting essentially of at least six recurring divalent monomeric units, at least one of which units contains a hydrogen atom directly bonded to an aliphatic carbon atom, and a non-crosslinked silicone compound containing at least one olefinically unsaturated substituent attached to silicon and being substantially free of Si—H groups. The organic polymer reacted can be free of silicon atom and olefinic unsaturation, and can contain no atoms other than carbon, hydrogen, oxygen, sulfur, nitrogen and halogen. Due to their non-crosslinked nature and the presence of both silicone and organic moieties therein, the graft copolymers of this invention are useful as surfactants.

While not wishing to be bound by any particular theory or mechanism, the grafting reaction involved in the process of this invention is thought to be initiated by a free radical generator, such as a peroxide, through abstraction from the organic polymer of a hydrogen atom that is bonded to an aliphatic carbon atom. The resulting "activated" organic polymer, which now contains a free radical site along the polymer chain, reacts with an olefinically unsaturated silicone compound by addition to the carbon-carbon double bond thereby forming an "activated" silicone-organic polymer copolymer containing a free radical site. The "activated" silicone-organic polymer copolymer can stabilize itself by abstraction of hydrogen from unreacted organic polymer present (chain transfer) or by undergoing subsequent reaction with unreacted olefinically unsaturated silicone in a manner characteristic of free radical catalyzed vinyl polymerizations. The graft copolymer has a bond produced by a grafting reaction involving the removal of a carbon-bonded hydrogen atom of the organic polymer followed by the reaction of the latter carbon atom with a group represented by R in the silicone compound to form a bond between the organic polymer and the silicone compound.

The resulting novel non-crosslinked graft copolymers of this invention thus formed can be graphically illustrated as:

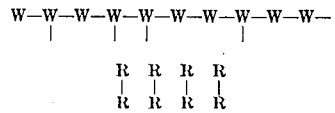

wherein W represents a repeating unit of the organic "-backbone" polymer and R represents a repeating unit of the silicone compound employed, the first R unit of each side chain silicone moiety attached to the backbone polymer being bonded thereto by a carbon-to-carbon bond.

Siloxanes useful in producing the graft copolymers of this invention include siloxanes consisting essentially of groups having the formula

wherein R is an olefinically unsaturated monovalent hydrocarbon group, R' is a monovalent hydrocarbon group free of aliphatic (olefinic or acetylenic) unsaturation, $a$ has a value from 1 to 3 inclusive, $b$ has a value from 0 to 2 inclusive, and $(a+b)$ has a value from 1 to 3 inclusive.

Illustrative of the groups represented by R in formula (I) are the alkenyl groups (e.g. the vinyl, allyl, methallyl, and butenyl groups), the cycloalkenyl groups (e.g. the cyclopentenyl and the cyclohexenyl groups) and the alkenyl-aryl groups (e.g. the vinyl phenyl group, $CH_2$ $CHC_6H_5$—).

Illustrative of the groups represented by R' in formula (I) are the alkyl groups (e.g. the methyl, ethyl, propyl, and butyl groups), the aryl groups (e.g. the phenyl and naphthyl groups), the aralkyl groups (e.g. the beta-phenyl-ethyl groups) and the cycloalkyl groups (e.g. the cyclopentyl and cyclohexyl groups).

Useful silicone compounds of the siloxane variety also include siloxanes consisting essentially of from 2 to 98 mole-percent (preferably from 10 to 40 mole-percent) of groups represented by formula (I) and from 2 to 98 mole-percent (preferably from 60 to 90 mole-percent) of groups having the formula

wherein R' has the meaning defined in formula (I) and $c$ has a value from 1 to 3 inclusive.

The above-described siloxanes that are useful in this invention are substantially free of SiH groups and can contain unhydrolyzed groups (e.g. Si-acetoxy groups) as endblocking groups.

Suitable siloxanes of the trifunctional variety can be more specifically depicted as containing the structural unit

wherein R is as defined for formula (I), X is OH or a hydrolyzable group (e.g., methoxy propionyloxy, phenoxy, tertiary butoxy or acetoxy group), and $c$ has an average value of from 0 to 1 and can be as high as 2 but preferably is from 0.1 to 1.

Polysiloxanes of the latter variety which are essentially free of silicon-bonded X groups (i.e., c in formula (IIa) is zero) can be prepared by the complete hydrolysis and complete condensation of hydrocarbyltrimethoxysilanes, whereas the hydrocarbylpolysiloxanes in which X represents predominantly silicon-bonded methoxy groups can be prepared by the partial hydrolysis and complete condensation of the same starting silane. On the other hand, hydrocarbylpolysiloxanes in which X represents predominantly silicon-bonded hydroxyl groups can be prepared by the essentially complete hydrolysis and partial condensation of the same hydrocarbyltrimethoxysilanes. By way of illustration a vinyl-polysiloxane containing silicon-bonded methoxy groups can be prepared by hydrolyzing vinyl-trimethoxysilane with an amount of water insufficient to react with all of the silicon-bonded methoxy groups present on the starting silane and subsequently condensing the hydrolyzate so formed to produce the desired polymer.

Suitable siloxanes of the difunctional varieties which include cyclic and linear polysiloxanes, can be more specifically illustrated by the structural formula

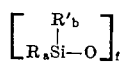

wherein $a$ is an integer having a value of from 1 to 2, $b$ has a value of 0 to 1, R and R' represent the same groups as defined hereinbefore in formula (I); and wherein "$f$" is an integer having a value of at least 3. Such cyclic and linear polysiloxanes can be prepared by the hydrolysis and condensation of hydrocarbyl(hydrocarbyl)dimethoxysilanes or di(hydrocarbyl)dimethoxysilanes. In carrying out the hydrolysis and condensation procedures there is produced a product comprising a mixture of cyclic and linear polysiloxanes from which the desired polysiloxane can be isolated and recovered. Illustrative of the cyclic polysiloxanes suitable for use in this invention are the cyclic tetramer of vinyl(propyl)siloxane and the like. Illustrative of linear polysiloxanes are 1-allyl(methyl)polysiloxane, vinylbutylpolysiloxane, para-vinylphenylheptylpolysiloxane, di(butenyl)polysiloxane, and the like.

Included among the linear siloxanes which can be employed in our process are the alkyl, methoxy, acetoxy or hydroxyl endblocked polysiloxanes which contain from 1 to 3 of such groups bonded to the terminal silicon atoms of the molecules comprising the polymer chains. Thus there can also be employed as the starting hydrocarbylsilicon compound such linear endblocked hydrocarbylpolysiloxanes as monoacyloxy endblocked vinylpropylpolysiloxane or methyldimethoxysilyl endblocked butenylmethylpolysiloxane, and the like. The endblocked linear hydrocarbylpolysiloxanes useful in the process of this invention can be prepared by the equilibration of cyclic hydrocarbylpolysiloxanes with silicon compounds containing predominantly silicon-bonded X groups, or by cohydrolysis and condensation of trialkylmethoxysilanes with hydrocarbylalkoxysilanes. Hydroxyl end-blocked linear polysiloxanes can also be prepared by heating linear or cyclic hydrocarbylpolysiloxanes with water.

Although siloxanes containing hydrolyzable and hydroxyl groups are in general operable, it is preferred that such groupings be present only in minor amounts to keep undesirable side reactions to a minimum.

Siloxane polymers containing silanic hydrogen or free radical inhibiting substituents are especially to be avoided since the presence of such substituents can alter the course of the grafting reaction or prevent it from occurring. Trace amounts of such substituents are, of course, permissible.

The olefinic siloxane and organic polymers that are suitable for use in producing the graft copolymers of this invention are non-crosslinked materials. That is, they are not thermoset solids or gels but can, of course, have a certain amount of branching. Included are both liquid polymers (including those that are capable of further polymerization to form solid thermoplastic or thermoset polymers) and thermoplastic solid polymers. The organic polymers can be free of silicon atoms and olefinic unsaturation and can contain no atoms other than carbon, hydrogen, oxygen, sulfur nitrogen and halogen.

Suitable organic polymers consist essentially of at least six recurring divalent monomeric units, at least one of which contains a hydrogen atom bonded directly to an aliphatic carbon atom and are free of silicon atoms and olefinic unsaturation.

Illustrative of the organic polymers which are useful as starting materials in the process of this invention are those represented generally by the formula $$A - \left[ W - Y \right]_n - B \qquad (III)$$

wherein W and Y represent the same or different repeating units of the organic polymer, A and B are the end groups of the polymer and $n$ is an integer having values of 3 or greater.

W and Y preferably represent repeating units of organic polymers which are thermoplastic, that is polymers which can be softened with heat and while soft can be molded, cast or extended under pressure. These polymers when cooled below their softening point become rigid and retain the shape of the mold. However, on reheating, these materials again become soft and can be remolded.

Illustrative of the repeating units W and Y of formula (III) which can make up the organic polymers which are useful as starting materials in the process of this invention are:

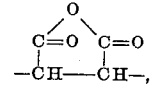

—CH$_2$—CCl$_2$—, —CH$_2$—CFH—, CF$_2$—CFCl—, —CH$_2$—CH(CN)— or —CH$_2$—CH(OR)— and the like and units having substantially non-reactive olefinic double bonds such as: -ch$_2$—CH   CHCCl$_2$—, —CH$_2$—CH   C(CH$_3$)—CH$_2$— and —CH$_2$—CH   CCl—CH$_2$—. It is, of course, understood that organic polymers which are useful as starting materials in this invention include not only those polymers which consist of only one or two different units but also include those containing 3 or more different units. These organic polymers are commonly prepared by well known free radical polymerization or copolymerization processes. Commonly in processes of this type the end groups represent free radical initiator fragments or groups picked up by chain transfer processes.

Illustrative of another class of repeating units W and Y in formula (III), which can make up the organic polymers which are useful as starting materials in the process of this invention are those which make up thermoplastics such a polyurethanes, polyesters (such as Dacron, Orlon and polymers of —CH$_2$—CH(COOR) and/or

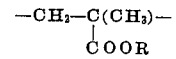

units where R is alkyl), epoxide resins, polyacetals such as Delrin, polysulfides such as Thiokol, polycarbonates, phenoxy resins, and the like. These organic polymers are commonly prepared by ionic process which may or may not involve the elimination of volatile by-products. Such processes are well known. In this polymers the end groups may be derived from either or both of the coreactants used to make up the polymer.

Preferred organic polymers include polystyrene consisting essentially of polymerized styrene, polyacrylates consisting essentially of a polymerized alkyl acrylate and polyvinyl chlorides consisting essentially of polymerized vinyl chloride.

The organic polymers which are useful as starting materials in the process of this invention are well known.

A free radical generator is essential as a catalyst in preparing the silicone-organic polymer graft copolymers of this invention. The free radical generators which are used in this invention are organic peroxides. Illustrative of the organic peroxides which can be employed are hydroperoxides such as t-butyl hydroperoxide, cumene hydroperoxide, tetralin hydroperoxide, and triphenylmethylhydroperoxide; peroxy acids such as peroxy acetic acid, peroxybenzoic acid, monoperoxyphthalic acid, diperoxyphthalic acid, and 2,4-dichloroperoxybenzoic acid; diorganoperoxides such as ditertiarybutyl peroxide, ascaridol, benzoyl peroxide, 2,4-dichlorobenzoyl peroxide, t-butyl perbenzoate, diacetyl peroxide, dicumyl peroxide, di-t-butyldiperoxyphthalate, (Me$_3$COO)$_2$Me$_2$, and the like. Diorganic peroxides, as for example ditertiary butyl peroxide are preferred catalysts for the grafting reaction. The amount of the organic peroxide catalyst employed is not critical although catalyst concentrations from 0.1–10 percent by weight based on the weights of the reactants can be used advantageously. The amount of catalyst generally preferred ranges from 1.0–5 percent by weight of the reactants. Ionizing radiation or azo compounds can be used as the free radical generator.

The temperature at which the reaction is carried out to produce the graft copolymers of this invention will depend on the free radical generator employed and should be high enough to cause formation of free radicals in the reaction mixture. Suitable temperatures range from 30°–225° C. with 80°–175b$L$ C. being the preferred range.

Often, the olefinically unsaturated siloxanes are not miscible with organic polymers and difficulties arise in reacting these materials unless a suitable solvent is used, such as, for example, toluene or xylene. The reaction temperature is, therefore, limited by the reflux temperature of the solution and a higher boiling solvent will permit a higher temperature. The type of solvent is critical only insofar as the starting materials must be mutually soluble therein and the solvent must be relatively inert to free radical attack. It is also necessary that the amount of solvent be sufficient to provide a homogeneous solution of the starting materials at the reaction temperature.

While the reaction can be carried out at subatmospheric pressure there is usually no advantage to doing so.

The relative amounts of olefinic siloxane and organic polymer used in preparing the graft copolymers of this invention depends to a large extent upon the number and reactivity of the olefinic substituents in the siloxane as well as the weight per cent of silicone desired in the copolymer. When the siloxane contains an average of only one olefinic substituent the ratio of siloxane reactant to organic reactant can vary over an almost unlimited range being controlled chiefly by practical considerations. Usually the preferred amount of siloxane in the copolymer is from 5 to 95 percent by weight based on the total graft copolymer used since smaller amounts do not normally give graft copolymers with widely useful properties.

A surprising feature of the present invention is that siloxane polymers containing a multiplicity of olefinic substituents can be grafted to organic polymers without the formation of crosslinked gels. While a broad range of copolymer compositions can be prepared from such materials it is generally preferred to use a reactant ratio which will give 5 to 50 percent by weight of siloxane in the copolymer. When fluid copolymers containing higher percentages of siloxane are desired these are readily obtained by fractionation of the grafted copolymer with a suitable solvent to remove copolymer compositions low in siloxane. Solvent fractionation procedures are also useful in removing ungrafted organic polymer from the copolymer particularly when the organic polymer is of low molecular weight. Formation of crosslinked gels can be minimized if the mole ratio of monomeric units in the organic polymer to olefinic substituents in the siloxane polymer is greater than eight to one during the grafting process. Gelation in the copolymer can also be minimized by adding a mixture of the olefinic siloxane and free radical catalyst dropwise to a refluxing solution of the organic polymer over a longer reaction time than that used when all the reactants are heated together. When gelation occurs it is not extensive, especially if the above precautions are taken. The undesired gelled (crosslinked) graft copolymers can be readily separated from the desired non-crosslinked graft copolymers by selectively dissolving the latter in suitable solvents.

The hydrolytically stable graft copolymers of this invention range in properties from water soluble materials to water insoluble materials depending on the type of organic polymer used and the weight percent of silicone present.

The graft copolymers of this invention are useful as rubber lubricants, particularly for tire molds, lubricants for metal-to-metal moving surfaces and textile lubricants. In addition, the copolymers of this invention are particularly useful as surfactants and as additives to thermoplastic organic polymers to improve the levelling and other properties thereof. The surfactant properties of the graft copolymers of this invention are due to the chemical moieties therein and to their non-crosslinked structures. The non-crosslinked nature of the graft copolymers is evidenced by the fact that they are liquids or low melting solids and that they are soluble in solvents such as aromatic hydrocarbons (e.g., benzene, toluene, xylene, etc.) and aromatic ethers (e.g., diphenyl ethers). Known silicone-organic graft copolymers are not useful as surfactants because of their crosslinked structures.

Blends composed of a mixture of a relatively small amount of a graft copolymer of this invention and a relatively large amount of a thermoplastic organic polymer (such as the organic polymers used in producing the graft copolymers of this invention) possess various highly desirable properties. Such properties enhance the usefulness of the organic polymers in the various areas of application in which they are normally employed. Such properties include improved release from molds wherein molded products are made from the organic polymers, improved levelling of coating compositions containing the organic polymers, improved filler dispersion in the organic polymers, improved adhesion, improved slip, improved anti-block, improved rheological properties, and the like. Particularly useful blends are those composed of copolymers of this invention mixed with relatively large amounts of polystyrene, poly(alkylacrylate) or polyvinyl chloride. Preferably, such blends contain from 0.01 to 10 parts by weight of the graft copolymer per 100 parts by weight of the organic polymer. Even more desirable are the blends containing from 0.1 to 5 parts by weight of the graft copolymer per 100 parts by weight of the organic polymer. Such blends can be conveniently prepared by mixing together the desired amount of the graft copolymer and the thermoplastic organic polymer. Alternatively, the blends can be prepared by reacting the silicone compound as described above with a large excess of the organic polymer by the above-described grafting process. Such blends can contain, as additional components, any of the fillers, stabilizers, plasticizers, diluents, dyes, catalysts or other ingredients normally added to the organic polymer to modify the polymer for use in any of the applications in which the organic polymer is conventionally employed.

The following examples illustrate the present invention:

In the following examples, "Lites" denotes volatile materials, "desolvate" denotes removal of volatile materials by volatilization, "Me" denotes a methyl group and "percent" denotes percent by weight. In each example, the reaction mixture was a homogeneous solution and the graft copolymer products were non-crosslinked as shown by their solubilities and/or melting points.

EXAMPLE I

A vinylsiloxane was produced by equilibrating a mixture of 118.3 grams of $(CH_3)_3SiO(CH_3)_2SiOSi(CH_3)_3$, 129.3 grams of cyclic siloxanes composed of $CH_3Si(CH\quad CH_2)O$ groups and 148.3 grams of $[(CH_3)_2SiO]_4$ employing 100 parts by weight of KOH per million parts by weight of the siloxanes as a catalyst. The product, after lites removal at 130°1.0mm., was a clear, water white siloxane that had a viscosity of 18 cstks. The siloxane had the average formula $(CH_3)_3Si[OSi(CH_3)_2]_{17}[OSi(CH\quad CH_2)CH_3]_3OSi(CH_3)_3$ as calculated from cryoscopic molecular weight analysis and bromine number.

To a 500 ml. 3 neck flask, fitted with a mantle, thermometer, Dean Stark trap, reflux condenser, agitator and an inert gas guard, was charged 100 grams of heavy mineral oil. The oil was a linear aliphatic hydrocarbon having a molecular weight from 260 to 300. The oil heated to 175° C. and 33 grams of the siloxane produced as described in the preceding paragraph and 3.3 grams of ditertiary butyl peroxide was added dropwise over a 1 hour period. The product was then sparged with nitrogen at 190° C. The product was hazeless on cooling, (simple mixtures of the mineral oil and the siloxane were hazy due to immiscibility). The mineral oil alone had a viscosity of 179.9 cstks. while the grafted material measured 1,610.8 cstks. Clearly the desired grafting of siloxane fluid to the mineral oil had been effected.

EXAMPLE II

A vinylsiloxane was produced by equilibrating a mixture of 280 grams of $Me_3SiO(SiMeViO)_3SiMe_3$ and 720 grams of $(Me_2SiO)_4$ employing 100 parts potassium hydroxide by weight of the siloxane as a catalyst. The lites-free product was a clear, water white siloxane that had a viscosity of 22.8 cstks. The siloxane had the average formula:

$(CH_3)_3Si[OSi(CH_3)_2]_{25}[OSi(CH$ 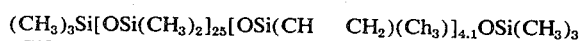 $CH_2)(Ch_3)]_{4.1}OSi(CH_3)_3$

Fifty gms. of methyl acrylate was polymerized in 1 pint of reagent grade toluene using 1 gram of azobisisobutyronitrile to initiate the polymerization. 40.7 gms. of solid polymethylacrylate was recovered.

To a 500 ml., 3 neck, round-bottom flask, fitted with a heating mantle, thermometer, Dean Stark trap, reflux condenser, agitator, a dropping funnel and an inert gas guard charged the 40.7 gms. of polymethylacrylate described above, 100 gms. of diphenyl ether and 200 ml. of xylene. The flask contents were heated to 180° C. removing the xylene and lites as they boiled up via the Dean Stark trap. While maintaining the flask contents at 180° C., the following mixture was added dropwise in 45 minutes: 1.0 gms. of ditertiary butyl peroxide, 10 gms. of the vinylsiloxane and 20 gms. of reagent grade xylene. An aliquot of the graft copolymer solution so produced was desolvated. A rubbery solid was recovered showing no signs of a separate silicone oil phase. A mixture of polymethylacrylate and silicone oil are mutually incompatible. The desolvated product (crude copolymer) analyzed 8.2 percent silicon, indicating the presence of 21 percent of siloxane. A portion of the graft copolymer solution, as made, was diluted with chloroform to reduce the viscosity and solids content, then added dropwise to 1 gallon of n-hexane. The graft copolymer poor in silicone and the ungrafted polymethylacrylate separated out as solid particles which were filtered free of the hexane containing silicone rich graft copolymer and ungrafted siloxane fluid, the solid precipitate was desolvated and analyzed 1.4 percent silicon indicating the presence of 3.7 percent of siloxane chemically bonded to the polymethylacrylate. The desolvated graft copolymers redissolved easily in chloroform.

EXAMPLE III

A vinylsiloxane was produced by equilibrating a mixture of 157.2 grams of $Me_3SiO(SiMe_2)OSiMe_3$, 86 grams of $(MeViSiO)_4$, and 355.4 grams of $(Me_2SiO)_4$, using 150 parts by weight of potassium hydroxide per million parts by weight of the siloxane as a catalyst. The lites-free product was a clear, water white siloxane that had a viscosity of 15.2 cstks. The siloxane had the average formula $(CH_3)_3Si[OSi(CH_3)_2]_{16.4}[OSi(CH$ 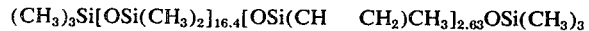 $CH_2)CH_3]_{2.63}OSi(CH_3)_3$ To a 500 ml. flask fitted as described in Example II above, was charged 50 gms. of polyvinylacetate which, according to its intrinsic viscosity had a molecular weight of 4,500–7,000. Also, charged to the flask was 150 gms. of diphenylether and 50 gms. of toluene. The flask contents were heated to 190° C. removing the toluene and other lites as they boiled up to the Dean Stark trap. While maintaining the temperature of the pot contents at 180° C., the following mixture was added dropwise in 1.5 hours: 20 gms. of vinylsiloxane as described above, 5.0 gms. of ditertiary butyl peroxide and 20 gms. of reagent grade toluene. The flask was cooled and a portion of its contents was desolvated. This desolvated product (crude graft copolymer) analyzed 9.1 percent silicon (24 percent siloxane) and was readily soluble in acetone. A diluted aliquot of the graft copolymer solution was added dropwise to 1 gallon of n-hexane. The graft copolymer relatively poor in silicone and ungrafted polyvinylacetate precipitated as filterable solids separable from the hexane containing the silicone rich graft copolymer and unreacted silicone oil. The precipitated graft copolymer was desolvated and analyzed 1.7 percent silicon. Neither the purified nor unpurified graft copolymers showed separate silicone oil phases.

EXAMPLE IV

A vinylsiloxane was produced by equilibrating a mixture of 249.7 gms. of $Me_3SiO(SiMeViO)_2SiMe_3$ and 454 gms. of $(Me_2SiO)_4$ employing potassium hydroxide as a catalyst. After removal of volatile materials the product was a clear water white siloxane that had a viscosity of 13.5 cstks. The siloxane had the average formula $(CH_3)_3Si[OSi(CH_3)_2]_{13.2}[OSi(CH$  $CH_2)CH_3]_{2.9}OSi(CH_3)_3$ To a 500 ml., 3 neck flask fitted as described in Example II above, were charged 100 gms. of polyvinylacetate as described in Example III above, 50 gms. of reagent grade xylene and 200 gms. of diphenylether. The contents of the flask were heated to 195° C. removing xylene and lites as they boiled up into the Dean Stark trap. While maintaining the flask contents at 185° C., the following mixture was added dropwise in an hour: 25 gms. of the vinysiloxane described above, 10 gms. of reagent grade xylene, 10 gms. of diphenylether and 3.8 gms. of ditertiary butyl peroxide. After the addition was complete, the flask contents were diluted to 500 cc. to obtain homogeneity at ambient temperatures, then the solution was added dropwise to 5 liters of n-hexane. The silicone-poor graft copolymer and ungrafted polyvinylacetate precipitated and was freed of the silicon rich graft copolymer and unreacted vinyl siloxane by filtration. 75.3 Gms. of hexane-insoluble polymer was realized after desolvation which analyzed 2.7 percent silicon ( 7.1 percent of siloxane). From the hexane solution 56.9 gms. of polymer was recovered which analyzed 14.9 percent silicon (39.3 percent siloxane). Both products were solids showing no evidence of a separate silicone oil phase and both were readily soluble in hot xylene.

EXAMPLE V

A vinylsiloxane was produced by equilibrating a mixture of 82.6 gms. of $Me_3SiO(SiMe_2)OSiMe_3$, 172 gms. of $(MeViSiO)_4$ and 245.4 gms. of $(Me_2SiO)_4$ employing potassium hydroxide as the catalyst. The lites free product was a clear, water white siloxane that had a viscosity of 32.6 cstks. The siloxane had the average formula $(CH_3)_3Si[OSi(CH_3)_2]_{34.8}[OSi(CH$  $CH_2)Me]_{16.4}OSi(CH_3)_3$ To a 500 ml., 3 neck flask fitted as described in Example II above, was charged 100 gms. of a hydrogenated castor oil (the triester of glycerol and ricinoleic acid) having a melting point of 87° C., 100 gms. of reagent grade xylene and 50 gms. of diphenylether. The flask contents were heated to 190° C., removing any lites and solvents that boiled up via the Dean Stark trap. While maintaining the flask temperature at 180°–190° C. for 1 hour and 15 minutes, the following mixture was added dropwise: 25 gms. of the vinylsiloxane described above, 7.5 gms. of ditertiary butyl peroxide, 10 gms. of reagent grade xylene and 10 gms. of diphenylether. The product solution was cooled to 150° C. and filtered into 3 pints of reagent grade xylene to remove any gel that may have been present. The xylene solution was cooled to 25° C. to precipitate the product and the precipitated product was filtered to separate graft copolymer which is soluble in the xylene from the graft copolymer which was insoluble in the xylene. The xylene-insoluble solid graft copolymer so recovered analyzed 9.4 percent silicon (24.8 percent siloxane), had a melting point of 68° C. and evidenced no separate oil phase as would have been the case if no grafting had occurred.

EXAMPLE VI

To a 500 ml., 3 neck flask fitted as described in example II above, was charged 50.3 gms. of hydrogenated castor oil (wax) described in Example V (which had been precipitated from xylene to remove any xylene-soluble fraction, the melting point was unchanged from the purified material, 87°–88° C.), 100 gms. of reagent grade xylene, 90 gms. of reagent grade chloroform and 100 gms. of diphenyl ether. The flask contents were heated to 190° C. and the low boiling solvents removed via the Dean Stark trap. While maintaining the flask contents at a temperature of 180° C., the following mixture was added dropwise in 1.5 hours: 34.4 gms. of a vinylsiloxane described in Example II above, 4.1 gms. of ditertiary butyl peroxide, 20 gms. of diphenyl ether and 20 gms. of reagent grade xylene. The reaction mixture was cooled and 3 pints of reagent grade xylene was added. The mixture was heated to 60° C. to obtain homogeneity, then cooled to 20° C. to precipitate the ungrafted wax and grafted wax fractions low in siloxane content. The precipitated wax was filtered free of the solvent and desolvated as described in Example II above. The desolvated xylene-insoluble (at room temperature) wax fraction had a melting point of 85°–87° C. and analyzed 2.4 silicon. On stripping xylene from the filtrate two fractions were obtained (when about half of the xylene had been removed solids formed and when the solution was cooled at 20° C. additional solids formed). After recovery by filtration and desolvation, these solids analyzed 19.5 percent silicon (51.5 percent siloxane) and had a melting point of 30°–33° C. The rest of the graft copolymer was recovered from the xylene and analyzed 21.1 percent silicon (55.5 percent siloxane) with a melting point of 33°–35° C. The graft copolymer products redissolved easily.

As will be apparent to those skilled in the art silicone and organic polymer reactants used in the above examples are mixtures of compounds differing from one another in the number of monomeric units in the molecule and, where the reactant contains more than one type monomeric unit, in the relative amounts of the monomeric units. Accordingly, it is also apparent that the resulting graft copolymer will also be a mixture of compounds differing from one another in these respects. Another difference between the individual graft copolymer species is the relative amounts of the silicone and the organic moieties therein. Further, the graft copolymer usually contains small amounts of unreacted silicone and organic polymers and crosslinked copolymers, the amounts of which materials can be reduced to insignificant amounts (i.e., amounts that do not effect the gross properties of the product, particularly its non-crosslinked properties) by the separation procedures outlined above.

What is claimed is:

1. A non-crosslinked siloxane-organic polymer graft copolymer composed of (1) a non-crosslinked olefinic siloxane selected from the group consisting of:
   A. siloxanes consisting essentially of groups having the formula:

$$R_a SiO_{\frac{4-(a+b)}{2}}^{'b} \quad (I)$$

wherein R is an olefinically unsaturated monovalent hydrocarbon group, R' is a monovalent hydrocarbon group free of aliphatic unsaturation, $a$ has a value from 1 to 3 inclusive, $b$ has a value from 0 to 2 inclusive, and ($a+b$) has a value from 1 to 3 inclusive; and
   B. siloxanes consisting essentially of from 2 to 98 mole-percent of groups represented by formula (I) and from 2 to 98 mole-percent of groups having the formula:

$$R'_c SiO_{\frac{4-c}{2}} \quad (II)$$

wherein R' has the above-defined meaning and $c$ has a value from 1 to 3 inclusive, said olefinic siloxane being substantially free of SiH groups, grafted to (2) a non-crosslinked organic polymer which consists essentially of at least six recurring divalent monomeric units having the formula:

$$-CH_2-CH(OCOCH_3)-,$$

the siloxane portion of the copolymer represents from 5 to 95 percent by weight of the copolymer, said grafting occurring by the reaction of said R groups of the olefinic siloxane and a hydrogen atom directly bonded to an aliphatic carbon atom of the organic polymer.

2. An aromatic hydrocarbon-soluble graft copolymer as claimed in claim 1.

3. A process for producing a non-crosslinked siloxane-organic graft copolymer as defined in claim 1, said process comprising forming a reaction solution containing an olefinic siloxane as defined in claim 1, an organic polymer as defined in claim 1 and an organic peroxide catalyst and maintaining the reaction solution at a temperature from 30° to 225° C. to cause the olefinic siloxane and the organic polymer to react to form the graft copolymer.

4. A process as claimed in claim 3 wherein the siloxane is a siloxane oil consisting essentially of from 2 to 98 mole percent of groups represented by the formula:

$$R_a SiO_{\frac{4-(a+b)}{2}}^{'b} \quad (I)$$

wherein R is an olefinically unsaturated monovalent hydrocarbon group, R' is a monovalent hydrocarbon group free of aliphatic unsaturation, $a$ has a value from 1 to 3 inclusive, $b$ has a value from 0 to 2 inclusive, and ($a+b$) has a value from 1 to 3 inclusive; and from 2 to 98 mole-percent of groups having the formula:

$$R'_c SiO_{\frac{4-c}{2}} \quad (II)$$

wherein R' has the above-defined meaning and $c$ has a value from 1 to 3 inclusive, said olefinic siloxane being substantially free of SiH groups.

* * * * *

UNITED STATES PATENT OFFICE
CERTIFICATE OF CORRECTION

Patent No. 3,674,891                     Dated July 4, 1972

Inventor(s)   Marshall L. Wheeler, Jr.          Page 1 of 3

It is certified that error appears in the above-identified patent and that said Letters Patent are hereby corrected as shown below:

Last three lines,
Abstract, "-$CF_2$--, -$CH_2$-CH(CN)-, -$CH_2$-CH(OR)-, -$CH_2$-CH-$CCl_2$-, -$CH_2$-CH $C(CH_3)$-$CH_2$- and -$CH_2$CH $ClCH_2$-wherein R is alkyl)."
should be "-$CF_2$-CFCl-, -$CH_2$-CH(CN)-, -$CH_2$-CH(OR)-, -$CH_2$-CH=CH-$CCl_2$-, -$CH_2$-CH=C($CH_3$)-$CH_2$-and-$CH_2$CH=$ClCH_2$-wherein R is alkyl)."

Col. 1, line 75, "W-W-W-W-W-W-W-W-W-W-"
                       |  |       |        |
                       R  R R R
                       |  |  |  |
                       R R R R should be "W-W-W-W-W-W-W-W-W-W-"
            |   | |         |
            R   R R         R
            |   | |         |
            R   R R         R Col. 2, line 1, after "organic", ".backbone" should be "backbone".

Col. 2, line 24, after "phenyl group", "$CH_2$ $CHC_6H_5$-)." should be "$CH_2$=$CHC_6H_5$-).".

Col.4, line 20, "$ch_2$-CH $CHCCl_2$-, -$CH_2$-CH $C(CH_3)$-$CH_2$- and -$CH_2$-CH $CCl$-$CH_2$-" should be "$CH_2$-CH=$CHCCl_2$-, -$CH_2$-CH=C($CH_3$)-$CH_2$- and -$CH_2$-CH=$CCl$-$CH_2$".

Col. 4, line 46, after "In", "this" should be "these".

UNITED STATES PATENT OFFICE
CERTIFICATE OF CORRECTION

Patent No. 3,674,891            Dated July 4, 1972

Inventor(s) Marshall L. Wheeler, Jr.,      Page 2 of 3

It is certified that error appears in the above-identified patent and that said Letters Patent are hereby corrected as shown below:

Col. 4, line 67, "$(Me_3COO)_2Me_2$" should be "$(Me_3COO)_2CMe_2$".

Col. 5, line 6, "80°-175bLC" should be "80°-175°C.".

UNITED STATES PATENT OFFICE
CERTIFICATE OF CORRECTION

Patent No. 3,674,891        Dated July 4, 1972

Inventor(s) Marshall L. Wheeler, Jr.      Page 3 of 3

It is certified that error appears in the above-identified patent and that said Letters Patent are hereby corrected as shown below:

Col. 6, line 51, "$CH_3Si(CH \quad CH_2)O$" should be "$CH_3Si(CH=CH_2)O$".

Col. 6, line 58, "$(CH_3)_3Si[OSi(CH_3)_2]_{17}[OSi(CH \quad CH_2)CH_3]_3 OSi(CH_3)_3$" should be "$(CH_3)_3Si[OSi(CH_3)_2]_{17}[OSi(CH=CH_2)CH_3]_3 OSi(CH_3)_3$".

Col. 7, line 10, so much of the formula as reads "$[OSi(CH \quad CH_2)(Ch_3)]_{4.1}$" should read "$[OSi(CH=CH_2)(CH_3)]_{4.1}$".

Col. 7, line 55, so much of the formula as reads "$[OSi(CH \quad CH_2)CH_3]_{2.63}$" should be read "$[OSi(CH=CH_2)CH_3]_{2.63}$".

Col. 8, line 13, so much of the formula as reads "$[OSi(CH \quad CH_2)CH_3]_{2.9}$" should read "$[OSi(CH=CH_2)CH_3]_{2.9}$".

Col. 8, line 46, so much of the formula as reads "$[OSi(CH \quad CH_2)Me]_{16.4}$" should read "$[OSi(CH=CH_2)Me]_{16.4}$".

Col. 9, line 17 after "analyzed", "2.4 silicon" should be "2.4% silicon".

Col. 9, line 35, so much of the formula as reads "Ra-" should read "$R_a$".

Col. 10, line 40, so much of the formula as reads "Ra-" should read "$R_a$".

Signed and Sealed this sixteenth Day of March 1976

[SEAL]

Attest:

RUTH C. MASON
Attesting Officer

C. MARSHALL DANN
Commissioner of Patents and Trademarks